(No Model.) 2 Sheets—Sheet 1.

J. C. MINER.
CAR BRAKE.

No. 526,934. Patented Oct. 2, 1894.

WITNESSES:
F. McArdle
C. Sedgwick

INVENTOR
J. C. Miner
BY Munn & Co
ATTORNEYS.

(No Model.)  2 Sheets—Sheet 2.

J. C. MINER.
CAR BRAKE.

No. 526,934. Patented Oct. 2, 1894.

WITNESSES:
F. McArdle,
Ca Sedgwick

INVENTOR
J. C. Miner
BY
Munn & Co.
ATTORNEYS.

UNITED STATES PATENT OFFICE.

JOHN C. MINER, OF SMYRNA, ASSIGNOR OF ONE-HALF TO HENRY FOX, JR., OF NELSON, NEBRASKA.

CAR-BRAKE.

SPECIFICATION forming part of Letters Patent No. 526,934, dated October 2, 1894.

Application filed February 6, 1894. Serial No. 499,245. (No model.)

*To all whom it may concern:*

Be it known that I, JOHN C. MINER, of Smyrna, in the county of Nuckolls and State of Nebraska, have invented a new and Improved Car-Brake, of which the following is a full, clear, and exact description.

My invention relates to improvements in car brakes; and the objects of my invention are to dispense with the use of brake beams, to provide a simple and quickly and easily operated mechanism by which the brakes may be quickly and firmly set against the car wheels, and also to provide track brakes which, when the brakes are set against the wheels, will be simultaneously forced downward upon the rails so as to slightly lift the truck and prevent the wheels from sliding, thus preventing flat places from being worn on the wheels.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1:
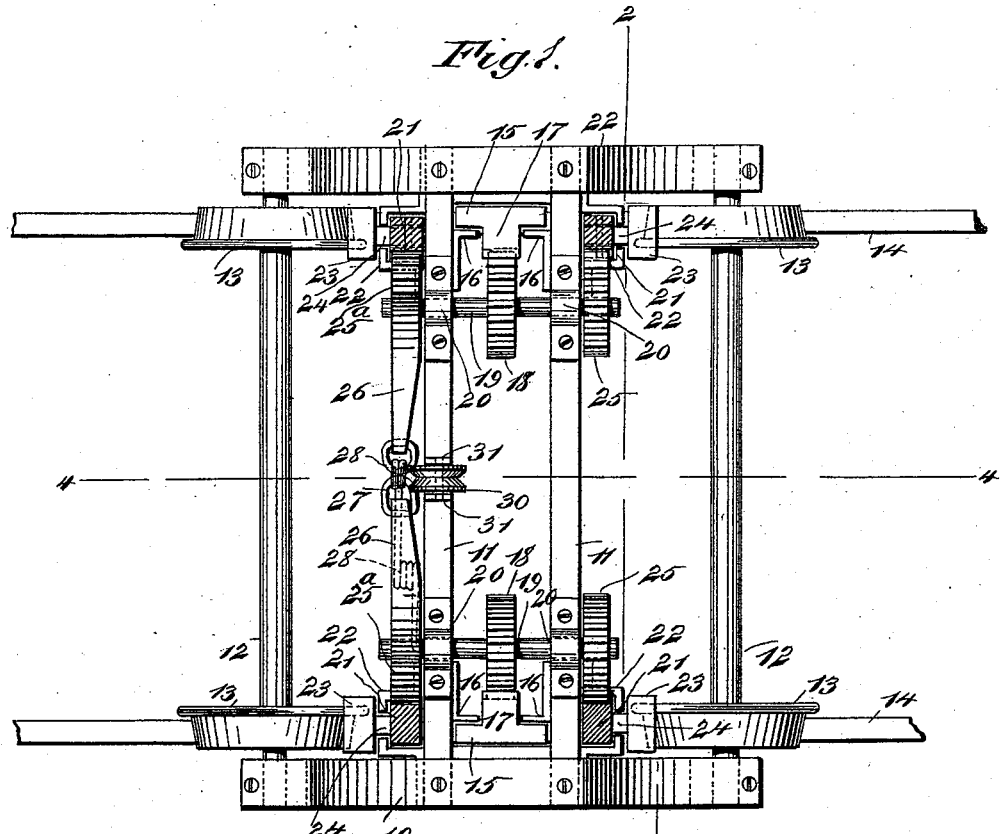
Figure 2:
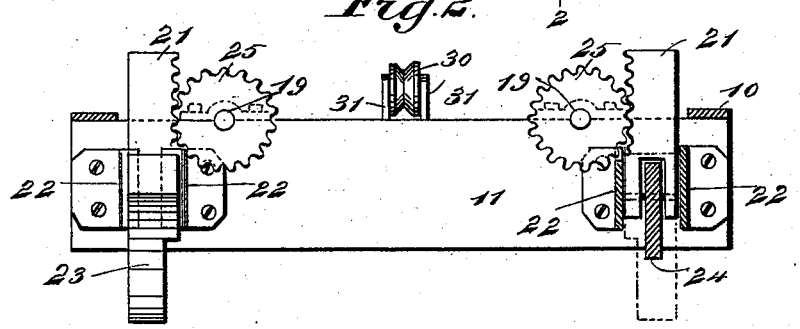
Figure 3:
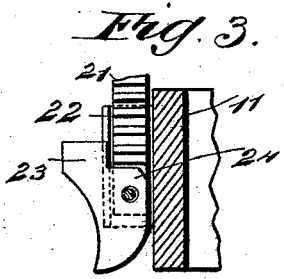
Figure 4:
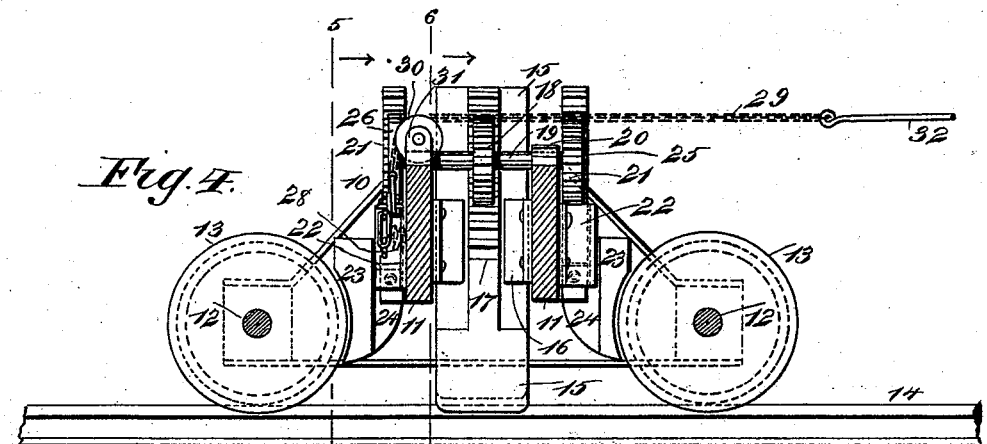
Figure 5:
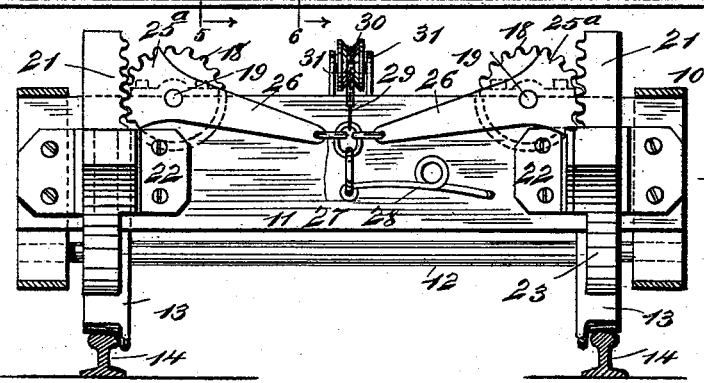
Figure 6:
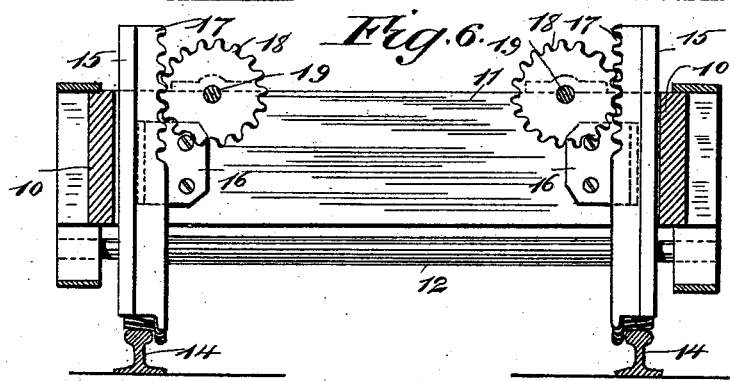
Figure 7:
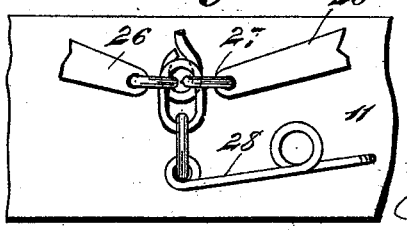

Figure 1 is a sectional plan of a car truck provided with my improved brake. Fig. 2 is a detail cross section on the line 2—2 of Fig. 1, and shows the means for operating the brakes and the manner in which the wheel brakes are hung. Fig. 3 is a detail sectional view, showing particularly the arrangement of one of the wheel brake shoes. Fig. 4 is a longitudinal section on the line 4—4 of Fig. 1. Fig. 5 is a cross section on the line 5—5 of Fig. 4. Fig. 6 is a cross section on the line 6—6 of Fig. 4; and Fig. 7 is an enlarged detail view, showing the means for normally depressing the brake levers.

The truck is provided with the usual frame 10, which may be of any approved construction, but which should have parallel cross bars 11, and in it are journaled the axles 12 in the usual way, it having the customary wheels 13 adapted to run on the track rails 14. Between the cross bars 11 and at opposite ends of the truck are vertically movable brake shoes 15 which slide in suitable slideways or boxes 16, best shown in Figs. 1 and 4, and the lower ends of these shoes are shaped to fit nicely on the rails 14. The shoes 15 have on their inner sides, vertical racks 17, which engage cog wheels 18 on the shafts 19, these being journaled in suitable boxes 20 on the cross bars 11 and thus, by turning the shafts, the shoes 15 may be raised or lowered so as to bring them into or out of contact with the track rails.

On the outer sides of the cross bars 11 and at the ends of the truck are vertically movable racks 21, each of which slides in a box 22 and carries a brake shoe 23 which is adapted to be wedged firmly against the wheel 13 nearest it, and the side of the shoe next the wheel is concaved, as shown in Fig. 3, so that it may fit nicely.

To further facilitate the adjustment of the shoe against the wheel, it is pivoted and has a shank 24 which projects through the front of the box 22 and is pivoted to the rack 21, as shown in Fig. 3. The racks 21 are engaged and actuated by wheels 25 and 25ª on the ends of the shafts 19, the wheels 25ª being only segments, as best shown in Fig. 5, and these merge in levers 26 which extend inward parallel with one of the cross bars 11, their inner ends being connected by links 27 and they are held normally downward by a spring 28 which connects with them and is fastened to the cross bar. The tension of the spring thus serves to hold the racks 21 and shoes 15 in a raised position, with the brake shoes clear of the track and wheels. The links 27 are also connected with a chain 29 which extends over a guide pulley 30 hung in supports 31 on one of the cross bars 11, and the chain is adapted to connect, by means of a rod 32 and the ordinary brake chains, with a shaft on the car, this arrangement being exactly of the usual kind and needing no detailed description and no illustrations.

When the brakes are to be set, the chain 29 is pulled, thus lifting the inner ends of the levers 26, and this causes the shafts 19 to be turned so as to force downward the racks 21 and 17, thus setting the shoes 15 on the rails 14 and the shoes 23 against the wheels 13. When the strain is removed from the chain 29, the spring 28 lifts the inner ends of the levers 26 and thus releases the brakes. If desired, the track brakes 15 may be dispensed with, although they are preferably employed.

Having thus described my invention, I claim as new and desire to secure by Letters Patent—

1. The combination, with the car truck, of the vertically movable racks thereon, a portion of the racks carrying shoes to engage the car wheels, and the remaining racks carrying shoes to contact with the track rails, substantially as described.

2. The combination, with the car truck, of the vertically movable racks thereon, a lever and gear mechanism for operating the racks, brake shoes carried by a portion of the racks to engage the car wheels, and a second set of brake shoes carried by the other racks and adapted to engage the rails of a track, substantially as described.

3. The combination, with the car truck, and the vertically movable racks thereon, of the shafts and gear wheels for moving the racks, and the spring-repressed levers for turning the shafts, substantially as described.

4. The combination with a car truck, of vertically movable racks, shoes having shanks pivoted directly to the lower ends of said racks, and a lever and gear mechanism for actuating said racks and shoes, substantially as described.

5. The combination, with the car truck, of the vertically movable racks thereon, the shoes carried by the racks and adapted to engage the car wheels, the shafts journaled on the truck and geared to the racks, the levers secured to the shafts, and mechanism for operating the levers, substantially as described.

6. The combination, with the car truck, of the vertically movable racks thereon, brake shoes pivoted to the racks and adapted to engage the car wheels, the shafts journaled on truck and geared to the racks, the inwardly-extending spring-repressed levers secured to two of the shaft gears, and means for moving the levers against the tension of the spring, substantially as described.

7. The combination, with the car truck having the parallel cross bars, of the vertically movable shoes mounted between the bars to engage the track rails, rack bars on the shoes, shafts journaled adjacent to the rack bars, cog wheels on the shaft to engage the rack bars, and a lever mechanism for turning the shafts, substantially as described.

JOHN C. MINER.

Witnesses:
C. A. ROBERTSON,
HENRY FOX, Jr.